(12) United States Patent
Harada et al.

(10) Patent No.: US 8,826,315 B2
(45) Date of Patent: Sep. 2, 2014

(54) ESTIMATION APPARATUS, ESTIMATION METHOD, PROGRAM, AND INTEGRATED CIRCUIT

(71) Applicant: Panasonic Corporation, Osaka (JP)

(72) Inventors: Naoyuki Harada, Osaka (JP); Iku Ohama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/114,320

(22) PCT Filed: Feb. 27, 2013

(86) PCT No.: PCT/JP2013/001184
§ 371 (c)(1),
(2), (4) Date: Oct. 28, 2013

(87) PCT Pub. No.: WO2013/132788
PCT Pub. Date: Sep. 12, 2013

(65) Prior Publication Data
US 2014/0082649 A1    Mar. 20, 2014

(30) Foreign Application Priority Data
Mar. 5, 2012 (JP) ................................ 2012-048201

(51) Int. Cl.
*H04N 7/16* (2011.01)
*H04N 7/173* (2011.01)
*H04N 21/442* (2011.01)
*G06F 17/30* (2006.01)
*H04N 21/466* (2011.01)

(52) U.S. Cl.
CPC ........... *H04N 21/4667* (2013.01); *H04N 7/173* (2013.01); *H04N 21/44222* (2013.01); *G06F 17/30* (2013.01); *H04N 21/4662* (2013.01)
USPC .................................. 725/14; 725/10; 725/13

(58) Field of Classification Search
USPC ................................................ 725/10, 13–14
See application file for complete search history.

(56) References Cited

U.S. PATENT DOCUMENTS 7,890,653 B2 * 2/2011 Kutsumi et al. ............... 709/238
2007/0011195 A1 * 1/2007 Kutsumi et al. ............ 707/104.1

FOREIGN PATENT DOCUMENTS

JP  2006-134308   5/2006
JP  4187722      11/2008

(Continued)

OTHER PUBLICATIONS

International Search Report issued Apr. 9, 2013 in corresponding International Application No. PCT/JP2013/001184.

(Continued)

*Primary Examiner* — Jason J Chung
*Assistant Examiner* — Sumaiya A Chowdhury
(74) *Attorney, Agent, or Firm* — Wenderoth, Lind & Ponack, L.L.P.

(57) ABSTRACT

An object is to provide an apparatus that accurately estimates an association between content and a user who performed an operation on the content. The apparatus includes: a first association information generation unit that generates first association information in which content information subjected to an operation and a user who performed the operation are associated; a learning unit that generates learnt information for associating a given user with content likely to be operated by the given user by using the first association information; an estimation unit that estimates a user by using unidentified content information for which the user cannot be identified and the learnt information; and a second association information generation unit that generates second association information in which the unidentified content information and the estimated user are associated. The learning unit updates the learnt information by preferentially using the first association information over the second association information.

9 Claims, 20 Drawing Sheets

(56) References Cited

FOREIGN PATENT DOCUMENTS

| | | |
|---|---|---|
| JP | 2009-116552 | 5/2009 |
| JP | 2009-303115 | 12/2009 |

OTHER PUBLICATIONS

Paul Graham, "A Plan for Spam", http://www.paulgraham.com/spam.html, Aug. 2002.

* cited by examiner

FIG. 3

| Program name | Genre | Broadcast start time |
|---|---|---|
| A | News show | 22:00 |
| B | News show | 23:00 |
| C | Drama | 23:00 |
| D | Variety show | 22:00 |
| E | Variety show | 21:00 |
| F | Drama | 21:00 |
| G | Drama | 22:00 |
| H | Drama | 22:00 |
| I | News show | 22:00 |
| J | Variety show | 21:00 |
| K | Variety show | 23:00 |

FIG. 4

| Program name | Genre | Broadcast start time | User name |
|---|---|---|---|
| A | News show | 22:00 | Father |
| B | News show | 23:00 | Father |
| C | Drama | 23:00 | Father |
| D | Variety show | 22:00 | Father |
| E | Variety show | 21:00 | Mother |
| F | Drama | 21:00 | Mother |
| G | Drama | 22:00 | Mother |

FIG. 5

$$\text{classify}(F_1 = f_1, \cdots, F_m = f_m)$$

$$= \underset{C}{\operatorname{argmax}}\ P(C) \prod_{i=1}^{m} P(F_i = f_i \mid C)$$

$$= \underset{C}{\operatorname{argmax}}\ \frac{\prod_{i=1}^{m} \text{Count}(C, F_i = f_i)}{\text{Count}(C)^{m-1}}$$

$F_i$ : Feature $i$ $C$ : Class

*Count*(.): Total number of items satisfying condition

FIG. 6

| C:<br>User name | Total number |
|---|---|
| Father | 4 |
| Mother | 3 |

Count(C)

| C:<br>User name | $F_1$: Genre | | |
|---|---|---|---|
| | News show | Variety show | Drama |
| Father | 2 | 1 | 1 |
| Mother | 0 | 1 | 2 |

Count(C, $F_1$)

| C:<br>User name | $F_2$: Broadcast start time | | |
|---|---|---|---|
| | 21:00 | 22:00 | 23:00 |
| Father | 0 | 2 | 2 |
| Mother | 2 | 1 | 0 |

Count(C, $F_2$)

FIG. 7

$$\text{classify}(F_1 = Drama, \cdots, F_2 = 22:00)$$

$$= \underset{C \in \{Father, Mother\}}{\text{argmax}} \frac{Count(C, F_1 = Drama)Count(C, F_2 = 22:00)}{Count(C)}$$

$$= \underset{C \in \{Father, Mother\}}{\text{argmax}} \left( \frac{1 \times 2}{4}, \frac{2 \times 1}{3} \right)$$

$$= \underset{C \in \{Father, Mother\}}{\text{argmax}} \left( \frac{1}{2}, \frac{2}{3} \right)$$

$$= Mother$$

FIG. 8

| Program name | Genre | Broadcast start time | Estimated user name |
|---|---|---|---|
| H | Drama | 22:00 | Mother |
| I | News show | 22:00 | Father |
| J | Variety show | 21:00 | Mother |
| K | Variety show | 23:00 | Father |

FIG. 11

| C:<br>User name | Total number |
|---|---|
| Father | 4.2 |
| Mother | 3.2 |

Count(C)

| C:<br>User name | $F_1$: Genre | | |
|---|---|---|---|
| | News show | Variety show | Drama |
| Father | 2.1 | 1.1 | 1 |
| Mother | 0 | 1.1 | 2.1 |

Count(C, $F_1$)

| C:<br>User name | $F_2$: Broadcast start time | | |
|---|---|---|---|
| | 21:00 | 22:00 | 23:00 |
| Father | 0 | 2.1 | 2.1 |
| Mother | 2.1 | 1.1 | 0 |

Count(C, $F_2$)

FIG. 14

Place a checkmark in the box that is correct

● Is it the program recorded by father?

| | Program name | Genre | Broadcast start time |
|---|---|---|---|
| ☐ | I | Drama | 2 2 : 0 0 |
| ☐ | K | Variety show | 2 3 : 0 0 |

● Is it the program recorded by mother?

| | Program name | Genre | Broadcast start time |
|---|---|---|---|
| ☑ | H | Drama | 2 2 : 0 0 |
| ☐ | J | Variety show | 2 1 : 0 0 |

[Reflect]

Place/remove a checkmark: Decision button

ESTIMATION APPARATUS, ESTIMATION METHOD, PROGRAM, AND INTEGRATED CIRCUIT

TECHNICAL FIELD

The present invention relates to a technique for estimating an association between content and a user who performed an operation on the content.

BACKGROUND ART

A content management apparatus, such as a HDD recorder, that manages content including broadcast programs, photos, music, and video is often shared among a plurality of users such as a family. Such a content management apparatus may require user authentication before a user performs an operation on content. When the user is identified through user authentication, "content" and "user who performed an operation on the content" can be associated with each other. Accordingly, if either one of content subjected to the operation performed by a given user or a user who performed an operation on given content is known, the other one can be identified by using the association information obtained through association processing. The technique disclosed in Patent Literature 1 is known as an example of such a conventional technique.

CITATION LIST

Patent Literature

[PTL 1] Japanese Patent No. 4187722

Non Patent Literature

[NPL 1] Paul Graham, *A Plan for Spam, In Hackers and Painters: Big ideas from the Computer Age*, O'Reilly Media, pp. 121-129, 2004

SUMMARY OF INVENTION

Technical Problem

With the technique disclosed in Patent Literature 1, however, there are cases where "content" and "user who performed an operation on the content" cannot be associated with each other. In other words, it is difficult to accurately estimate an association between content and a user who performed an operation on the content by using the technique of Patent Literature 1.

The present invention has been made to solve the problem encountered with conventional technology, and it is an object of the present invention to provide an apparatus that accurately estimates an association between content and a user who performed an operation on the content.

Solution to Problem

In order to achieve the above object, an estimation apparatus according to one aspect of the present invention is an estimation apparatus that estimates an association between content and a user who performed an operation on the content, the apparatus including: a receiving unit configured to receive an operation performed on content; a determining unit configured to determine whether or not an operating user who has performed the operation on the content can be identified based on the operation received by the receiving unit; a first association information generation unit configured to, when it is determined by the determining unit that the operating user can be identified, generate first association information in which the content subjected to the operation performed by the operating user and the operating user are associated with each other; a learning unit configured to generate learnt information for associating a given user with content likely to be operated by the given user by using the first association information; an estimation unit configured to estimate a user who has performed an operation on unidentified content by using the unidentified content and the learnt information generated by the learning unit, the unidentified content being content subjected to the operation when it is determined by the determining unit that the operating user cannot be identified; and a second association information generation unit configured to generate second association information in which the unidentified content and the user estimated by the estimation unit are associated with each other, wherein the learning unit is configured to update the learnt information by preferentially using the first association information over the second association information.

Note that the present invention can be implemented not only as an estimation apparatus including such characteristic processing units but also as an estimation method including processing of such characteristic processing units of the estimation apparatus as steps. Also, the present invention can be implemented as a computer program that causes a computer to execute the characteristic steps of the estimation method. Needless to say, such a computer program can be distributed via non-transitory computer-readable recording media such as CD-ROMs or communication networks such as the Internet.

Advantageous Effects of Invention

The present invention can produce an advantageous effect that an association between content and a user who performed an operation on the content can be estimated with high accuracy.

BRIEF DESCRIPTION OF DRAWINGS

FIG. 3 is a diagram showing an example of program information received by a receiving unit of the estimation apparatus according to Embodiment 1 of the present invention.

FIG. 4 is a diagram showing an example of first association information generated by a first association information generation unit of the estimation apparatus according to Embodiment 1 of the present invention.

FIG. 5 is a diagram showing an example of an algorithm used by a learning unit and an estimation unit of the estimation apparatus according to Embodiment 1 of the present invention.

FIG. 6 is a diagram showing an example of learnt information generated by the learning unit of the estimation apparatus according to Embodiment 1 of the present invention.

FIG. 7 is a diagram showing an example of calculation performed by the estimation unit of the estimation apparatus according to Embodiment 1 of the present invention.

FIG. 8 is a diagram showing an example of second association information generated by a second association information generation unit of the estimation apparatus according to Embodiment 1 of the present invention.

FIG. 11 is a diagram showing an example of learnt information generated by a learning unit of the estimation apparatus according to Embodiment 2 of the present invention.

FIG. 14 is a diagram showing an example of a confirmation screen displayed by a user confirmation unit of the estimation apparatus according to Embodiment 3 of the present invention.

Figure 1:
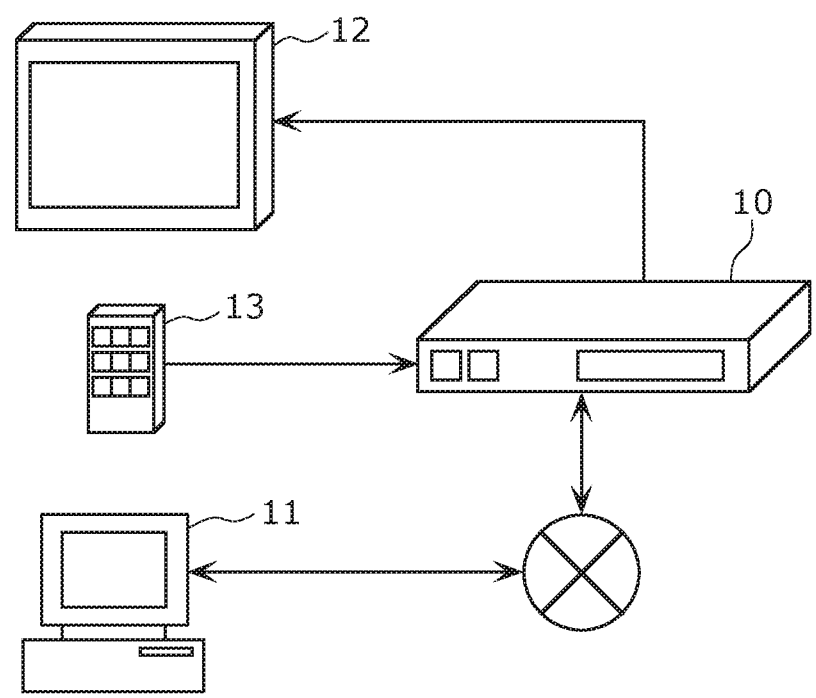
FIG. 1 is a diagram schematically showing an example of an overall configuration of a system including an estimation apparatus according to Embodiment 1 of the present invention.

DESCRIPTION OF EMBODIMENTS (Underlying Knowledge Forming Basis of the Present Invention)

The present inventors found that the following problems occur in the content management apparatus mentioned in the Background Art.

In the technique of Patent Literature 1 described above, user authentication is performed by using user information, such as a fingerprint, an image, a user number, and a user ID, in order to identify which user performed an operation on which content.

However, in the case where the user information is not available, "content" and "user who performed an operation on the content" cannot be associated with each other, and thus it is not possible to identify which user performed an operation on which content.

Meanwhile, there is a technique in which when data that is not associated with a label is given, the label that is to be associated with the data is estimated by using an "association rule" so as to obtain "estimated association information" in which the data and the estimated label are associated with each other. According to this technique, the "association rule" is generated by learning tendencies of association between data and a label from "correct association information" in which data and a label indicating the type of data are correctly associated.

As an example of such a conventional technique, the technique disclosed in Non Patent Literature 1 is known. According to Non Patent Literature 1, in order to estimate whether or not email is spam, association information between email data and a label "spam" and association information between email data and a label "non-spam" are prepared. Then, for each label, a word that appears in the body of email is counted so as to determine words that are likely to appear in spam email and words that are likely to appear in non-spam email, thereby learning the association rule between email data and each label. When a new email is given, calculation is performed by using the words that appear in the body of the email and the association rule so as to estimate whether the email is "spam" or "non-spam".

With a combination of Patent Literature 1 and Non Patent Literature 1, it is possible to estimate which user performed an operation on which content even when "content" and "user who performed an operation on the content" cannot be associated with each other. For example, there is a system in which two operation patterns are assumed: a pattern in which a user performs an operation on content after user authentication has been performed with a terminal apparatus (or a server); and a pattern in which a user performs an operation on content without user authentication being performed. In such a system, in the case of the pattern in which a user performs an operation on content after user authentication has been performed, "content" and "user who performed an operation on the content" can be associated with each other, so that association information obtained by that association can be stored as "correct association information", and "association rule" can be learnt by using the stored "correct association information". In the case of the pattern in which a user performs an operation on content without user authentication being performed, it is not possible to directly identify the user who performed an operation on the content. However, through the use of the "association rule" obtained by learning and "unassociated content" (currently operated content), it is possible to estimate which user performed an operation on which content and obtain "estimated association information".

Furthermore, the accuracy of estimation is improved by re-learning the "association rule" when "correct association information" is added through an operation of another content performed after user authentication has been performed. Accordingly, in the case where "correct association information" is repeatedly added, it is preferable to update the "association rule".

However, there is a possibility that, if the "estimated association information" is used in the same manner as the "correct association information" at the time of update of the "association rule", the "association rule" cannot be learnt correctly, as a result of which the accuracy of estimation might be reduced. This is because the "estimated association information" is merely an "estimation" and thus its credibility is not guaranteed.

In order to solve the above problem, an estimation apparatus according to one aspect of the present invention is an estimation apparatus that estimates an association between content and a user who performed an operation on the content, the apparatus including: a receiving unit configured to receive an operation performed on content; a determining unit configured to determine whether or not an operating user who has performed the operation on the content can be identified based on the operation received by the receiving unit; a first association information generation unit configured to, when it is determined by the determining unit that the operating user can be identified, generate first association information in which the content subjected to the operation performed by the operating user and the operating user are associated with each other; a learning unit configured to generate learnt information for associating a given user with content likely to be operated by the given user by using the first association information; an estimation unit configured to estimate a user who has performed an operation on unidentified content by using the unidentified content and the learnt information generated by the learning unit, the unidentified content being content subjected to the operation when it is determined by the determining unit that the operating user cannot be identified; and a second association information generation unit configured to generate second association information in which the unidentified content and the user estimated by the estimation unit are associated with each other, wherein the learning unit is configured to update the learnt information by preferentially using the first association information over the second association information.

With this configuration, the learning unit updates the learnt information by preferentially using the first association information over the second association information. Accordingly, at the time of update of the learnt information, it is possible to prevent a reduction in the accuracy of estimation caused by using the second association information, which is "estimated association information", in the same manner as the first association information, which is "correct association information".

Also, the learning unit may be configured to weight the first association information and the second association information such that a weight of the second association information is smaller than a weight of the first association information, and update the learnt information by using the first association information and the second association information that have been weighted.

With this configuration, the second association information is weighted together with the first association information such that the weight of the second association information is smaller than that of the first association information, and at the time of update of the learnt information, both the first association information and the second association information that have been weighted are used to update the learnt information. The conventional technology has a possibility that when the first association information is insufficient, the accuracy of estimation might be reduced due to lack of information needed at the time of learning, but the second association information that has been weighted together with the first association information such that the weight of the second association information is smaller than that of the first association information is used, and therefore the accuracy of estimation can be improved.

Also, the learning unit may be configured to update the learnt information by using only the first association information out of the first association information and the second association information.

With this configuration, at the time of update of the learnt information, among the first association information and the second association information, only the first association information is used without using the second association information. Accordingly, it is possible to prevent a reduction in the accuracy of estimation caused by using the second association information in the same manner as the first association information at the time of learning.

Also, the learning unit may be configured to change the weight of the first association information or the second association information according to a change in the number of pieces of the first association information. Also, the learning unit may be configured to: when the number of pieces of the first association information is not greater than a predetermined threshold value, update the learnt information by using the first association information and the second association information; and when the number of pieces of the first association information is greater than the threshold value, update the learnt information by using only the first association information. Also, the learning unit may be configured to: when the number of pieces of the first association information is not greater than a predetermined threshold value, update the learnt information by using only the first association information; and when the number of pieces of the first association information is greater than the threshold value, update the learnt information by using the first association information and the second association information.

With this configuration, when, for example, the number of pieces of first association information is not greater than the predetermined threshold value, the weight of the second association information, which is "estimated association information", is reduced, and the second association information whose weight has been reduced is added to learning, whereby the association information used at the time of learning can be increased as compared with the case where only the first association information is used, as a result of which the accuracy of estimation can be improved.

On the other hand, when the number of pieces of first association information is sufficient, adding the second association information to learning may compromise the effect of improving the accuracy of estimation. In other words, when the number of pieces of first association information is sufficient, use of the second association information causes a reduction in the accuracy of estimation. Accordingly, by not using the second association information at the time of learning when the number of pieces of first association information is greater than the predetermined threshold value, it is possible to prevent a reduction in the accuracy of estimation.

Also, the estimation apparatus may further include a user confirmation unit configured to confirm with a user whether or not the second association information generated by the second association information generation unit is correct; and an information converting unit configured to convert, into the first association information, the second association information that has been confirmed as correct by the user confirmation unit.

With this configuration, among the second association information, a piece of information that has been determined as having a correct association by the user is converted into the first association information, whereby the first association information can be increased, and therefore the accuracy of estimation can be improved.

An estimation apparatus according to one aspect of the present invention is an estimation apparatus that estimates an association between content and a user who performed an operation on the content, the apparatus including: a receiving unit configured to receive an operation performed on content; a determining unit configured to determine whether or not an operating user who has performed the operation on the content can be identified based on the operation received by the receiving unit; a first association information generation unit configured to, when it is determined by the determining unit that the operating user can be identified, generate first association information in which the content subjected to the operation performed by the operating user and the operating user are associated with each other; a learning unit configured to generate learnt information for associating a given user with content likely to be operated by the given user by using the first association information; an estimation unit configured to estimate a user who has performed an operation on unidentified content by using the unidentified content and the learnt information generated by the learning unit, the unidentified content being content subjected to the operation when it is determined by the determining unit that the operating user cannot be identified; a second association information generation unit configured to generate second association information in which the unidentified content and the user estimated by the estimation unit are associated with each other; and a user confirmation unit configured to confirm with the user whether or not the second association information generated by the second association information generation unit is correct, wherein the learning unit is configured to update the learnt information by preferentially using the first association information over the second association information.

With this configuration, the learning unit updates the learnt information by preferentially using the first association information over the second association information. Accordingly, at the time of update of the learnt information, it is possible to prevent a reduction in the accuracy of estimation caused by using the second association information, which is "estimated association information", in the same manner as the first association information, which is "correct association information".

These general and specific aspects may be implemented using a system, a method, an integrated circuit, a computer program, or a computer-readable recording medium such as a CD-ROM, or any combination of systems, methods, integrated circuits, computer programs, or recording media.

Hereinafter, embodiments of the present invention will be described with reference to the drawings. Each of the embodiments described below shows a specific example of a preferred embodiment of the present invention. The numerical values, structural elements, the arrangement and connection of the structural elements, steps, the processing order of the steps etc. shown in the following embodiments are merely examples, and therefore do not limit the scope of the claims. The scope of the invention is indicated by the appended claims. Therefore, among the structural elements in the following embodiments, structural elements not recited in any one of the independent claims that indicate the broadest concepts of the invention are not necessarily required to achieve the object of the present invention, but are described as structural elements that constitute preferable embodiments.

Hereinafter, a content operating user estimation apparatus according to embodiments of the present invention will be described with reference to the drawings.

[Embodiment 1]

FIG. 1 is a diagram schematically showing an example of an overall configuration of a system including an estimation apparatus 10 according to Embodiment 1 of the present invention.

The overall configuration of the system including the estimation apparatus 10 will be described first with reference to FIG. 1.

The estimation apparatus 10 is an apparatus that estimates an association between a broadcast program (content) and a user who performed an operation on the broadcast program. The estimation apparatus 10 specifically is a program recording and reproducing apparatus having a function of recording broadcast programs (television (hereinafter "TV") programs in particular), and includes two methods for setting a scheduled recording of a broadcast program: setting a scheduled recording via a network; and directly setting a scheduled recording. In the present embodiment, "content" refers to a broadcast program such as a TV program, and "operation" refers to a scheduled recording. Also, "scheduled recording" as used herein refers to an operation of designating program information (see below) regarding a given TV program so as to cause the estimation apparatus 10, which is a program recording and reproducing apparatus, to record the TV program, the operation being for setting a schedule for recording a program corresponding to the designated program information.

A terminal apparatus 11 is a terminal for causing the estimation apparatus 10 to set a scheduled recording of a TV program. In order to connect the terminal apparatus 11 to the estimation apparatus 10, the user who is operating the terminal apparatus 11 needs to be authenticated in advance by the estimation apparatus 10. In this way, because the user has been authenticated by the estimation apparatus 10 at the time of scheduled recording, the estimation apparatus 10 can identify the user who has set the scheduled recording with the terminal apparatus 11 via a network. The terminal apparatus 11 can be, for example, a mobile phone, a personal computer (PC), or the like.

An output apparatus 12 is an apparatus for displaying, on its screen, information received from the estimation apparatus 10. The output apparatus 12 can be, for example, a television display, a PC display, or the like.

An input apparatus 13 is an apparatus through which a user provides an input for scheduled recording of a TV program into the estimation apparatus 10 while the user is viewing information that is displayed on the screen of the output apparatus 12 as a result of the estimation apparatus 10 outputting that information. In other words, the user can set a scheduled recording on the estimation apparatus 10 by operating the input apparatus 13. In the case where a user sets a scheduled recording by using the input apparatus 13, the user may not always provide information for identifying himself/herself at the time of the scheduled recording. The input apparatus 13 can be, for example, a remote controller, or the like. The output apparatus 12 and the input apparatus 13 may be implemented as a single apparatus.

A configuration of the estimation apparatus 10 will be described next.

Figure 2:
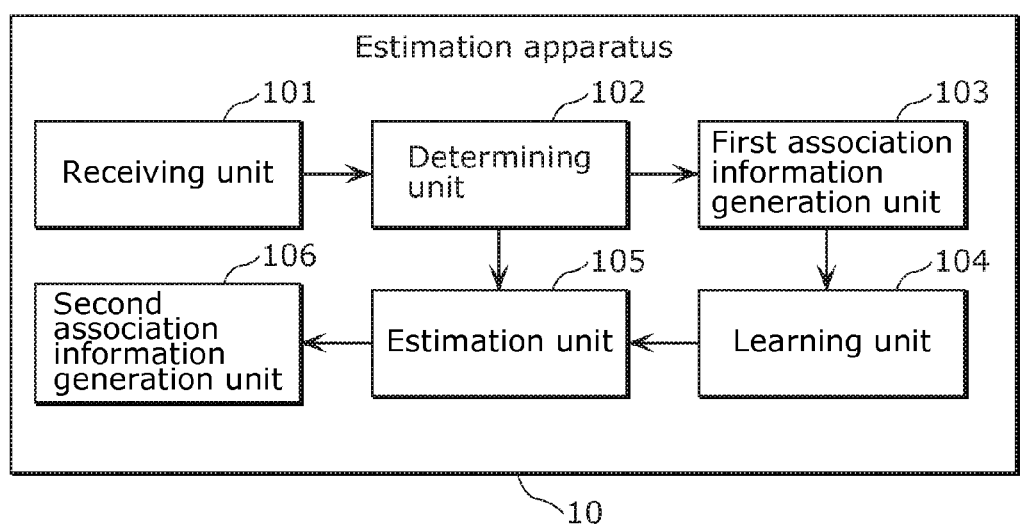
FIG. 2 is a diagram showing functional blocks of the estimation apparatus according to Embodiment 1 of the present invention.

FIG. 2 is a diagram showing functional blocks of the estimation apparatus 10 according to Embodiment 1 of the present invention.

A receiving unit 101 receives a scheduled recording (operation) of a TV program (content) set by a user. Specifically, the receiving unit 101 receives, in the case where a scheduled recording is set by a user through the terminal apparatus 11 such as a PC, program information, which is information regarding a TV program for which the scheduled recording was set, and user information, which is information indicating the user who set the scheduled recording. In other words, "a scheduled recording (operation) of a TV program (content)" as used herein includes an input operation for the user who is operating the terminal apparatus 11 to be authenticated by the estimation apparatus 10. Through this input operation, the receiving unit 101 receives the user information. In the case where a scheduled recording is set by using the input apparatus 13 such as a remote controller, the receiving unit 101 receives only the program information.

In the following description, TV program genre and broadcast start time are used as examples of the program information, but the program information may be any information as long as the information indicates a feature of the TV program, such as a keyword or the name of a cast member contained in the summary of a program listed in an electronic program guide (EPG), user information of another user who has set a scheduled recording of the same program, or the video or audio signal of the program. Alternatively, the user information can be, for example, a user name, but the user information is not limited to the user name, and can be any information as long as at least the user can be uniquely identified, such as an email address, a fingerprint, or an identifier.

Note that the receiving unit 101 acquires the user information only when a scheduled recording is set with the terminal apparatus 11, but the configuration is not limited thereto, and a configuration is also possible that prompts the user to input his/her user information through the input apparatus 13 such as a remote controller and causes the receiving unit 101 to receive the user information input through the input apparatus 13. In this case, for example, a fingerprint acquiring unit for acquiring a user's fingerprint may be provided in the input apparatus 13 so as to cause the receiving unit 101 to receive a fingerprint input through the input apparatus 13 as the user information. Alternatively, it is also possible to prompt the user to input an email address or identifier by using the input apparatus 13 so as to cause the receiving unit 101 to receive the email address or identifier as the user information.

FIG. 3 is a diagram showing an example of program information received by the receiving unit 101 of the estimation apparatus 10 according to Embodiment 1 of the present invention. FIG. 3 shows, for example, that program A is a news show scheduled to be broadcast from 22:00.

A determining unit 102 determines whether or not the operating user who performed an operation on the TV program (content) can be identified based on the operation received by the receiving unit 101. If it is determined that the operating user can be identified (i.e., if it is determined that the receiving unit 101 has received the user information), the determining unit 102 transfers the program information and the user information to a first association information generation unit 103, if, on the other hand, it is determined that the operating user cannot be identified (i.e., if it is determined that the receiving unit 101 has not received the user information), the determining unit 102 transfers the program information to an estimation unit 105.

If it is determined by the determining unit 102 that the operating user can be identified, the first association information generation unit 103 generates and stores first association information in which the program information (content information) regarding the TV program (content) operated by the operating user is associated with the operating user. In other words, the first association information generation unit 103 generates the first association information by using the program information and the user information transferred by the determining unit 102 (i.e., the program information and the user information received by the receiving unit 101).

FIG. 4 is a diagram showing an example of the first association information generated by the first association information generation unit 103 of the estimation apparatus 10 according to Embodiment 1 of the present invention. FIG. 4 shows, for example, that a scheduled recording of program A that is a news show scheduled to be broadcast from 22:00 has been set by a user named "father". As can be seen from this diagram, program information and users are associated with each other.

FIG. 5 is a diagram showing an example of an algorithm used by a learning unit 104 and the estimation unit 105 of the estimation apparatus 10 according to Embodiment 1 of the present invention. In FIG. 5, a technique called naive Bayes classifier is used as an example of the algorithm. The naive Bayes classifier is an algorithm for estimating a class by probability calculation when a predetermined feature is given. In the present embodiment, the genre and the broadcast start time that serve as the program information respectively correspond to features F1 and F2, and the user name that serves as the user information corresponds to class C. The user name can be estimated when the genre and the broadcast start time are given to the equation of the algorithm shown in FIG. 5.

Here, "learning" refers to calculation of a count function (Count(C, $F_i=f_i$) and Count(C)$^{m-1}$), which is a total number of items that satisfy a condition, and "estimation" refers to calculation of a classify function by using the calculated value of each count function (see FIG. 5). The algorithm used by the learning unit 104 and the estimation unit 105 is not limited to the naive Bayes classifier, and may be other classification algorithms such as decision tree, support vector machine, and boosting.

The learning unit 104 reads out the first association information stored in the first association information generation unit 103, and generates learnt information for associating a given user with a TV program (content) that is likely to be operated by the given user, by using the read-out first association information. In other words, the learning unit 104 learns tendencies of association between the program information and the user, and generates and stores learnt information, which is a result of learning.

FIG. 6 is a diagram showing an example of the learnt information generated by the learning unit 104 of the estimation apparatus 10 according to Embodiment 1 of the present invention. The learnt information shown in the diagram is information generated by the learning unit 104 by counting the number of scheduled recordings each user has set for each genre and for each broadcast start time, which is assumed to be used in estimation of the operating user by using the naive Bayes classifier. FIG. 6 shows, for example, that a user named "father" has set a scheduled recording of a program whose genre is news show twice and a program whose broadcast start time is 23:00 twice. In FIG. 6, each of the genre and the time is divided into three items, but these items may be integrated, or each of the genre and the time may be divided into more items.

If it is determined by the determining unit 102 that the operating user cannot be identified, the estimation unit 105 uses unidentified content, which is the operated TV program (content), and the learnt information so as to estimate the user who performed the operation on the unidentified content. In other words, the estimation unit 105 reads out the learnt information generated by the learning unit 104, estimates a user who is likely to operate the TV program corresponding to the program information by using the read-out learnt information and the program information received from the determining unit 102 (i.e., the program information received by the receiving unit 101), and transfers the program information and the estimated user to a second association information generation unit 106.

FIG. 7 is a diagram showing an example of calculation performed by the estimation unit 105 of the estimation apparatus 10 according to Embodiment 1 of the present invention. In this example, it is estimated which of a user named "father" and a user named "mother" has set a scheduled recording of a drama that is scheduled to be broadcast from 22:00 by using the naive Bayes classifier shown in FIG. 5 and the learnt information shown in FIG. 6. Here, ½ (father)<⅔ (mother), and thus it is estimated that the user "mother" has set a scheduled recording of the drama.

The second association information generation unit 106 generates second association information in which unidentified program information (unidentified content information) and the user estimated by the estimation unit 105 are associated with each other. In other words, the second association information generation unit 106 generates and stores the second association information in which the program information received from the estimation unit 105 (i.e., program information received by the receiving unit 101) and the user estimated by the estimation unit 105 are associated with each other.

FIG. 8 is a diagram showing an example of the second association information generated by the second association information generation unit 106 of the estimation apparatus 10 according to Embodiment 1 of the present invention. FIG. 8 shows, for example, that it has been estimated that a scheduled recording of program H that is a drama scheduled to be broadcast from 22:00 has been set by a user named "mother". As can be seen from the diagram, in the second association information, the program information and the estimated user are associated with each other.

The learning unit 104 reads out the learnt information generated by the learning unit 104 and the first association information generated by the first association information generation unit 103, and learns by using the learnt information and the first association information that have been read out. Then, the learning unit 104 updates the existing old learnt information with new learnt information, which is a result of learning, by overwriting. At this time, the learning unit 104 updates the learnt information by using only the first association information out of the first association information and the second association information. Note that the learning unit 104 may update the learnt information through learning from scratch using all of the first association information, or through learning using only an addition (i.e., a difference) of the first association information that has been added after generation of the old learnt information.

The foregoing has been a description of a configuration of the estimation apparatus 10.

An operation performed by the estimation apparatus 10 will be described next.

Figure 9:
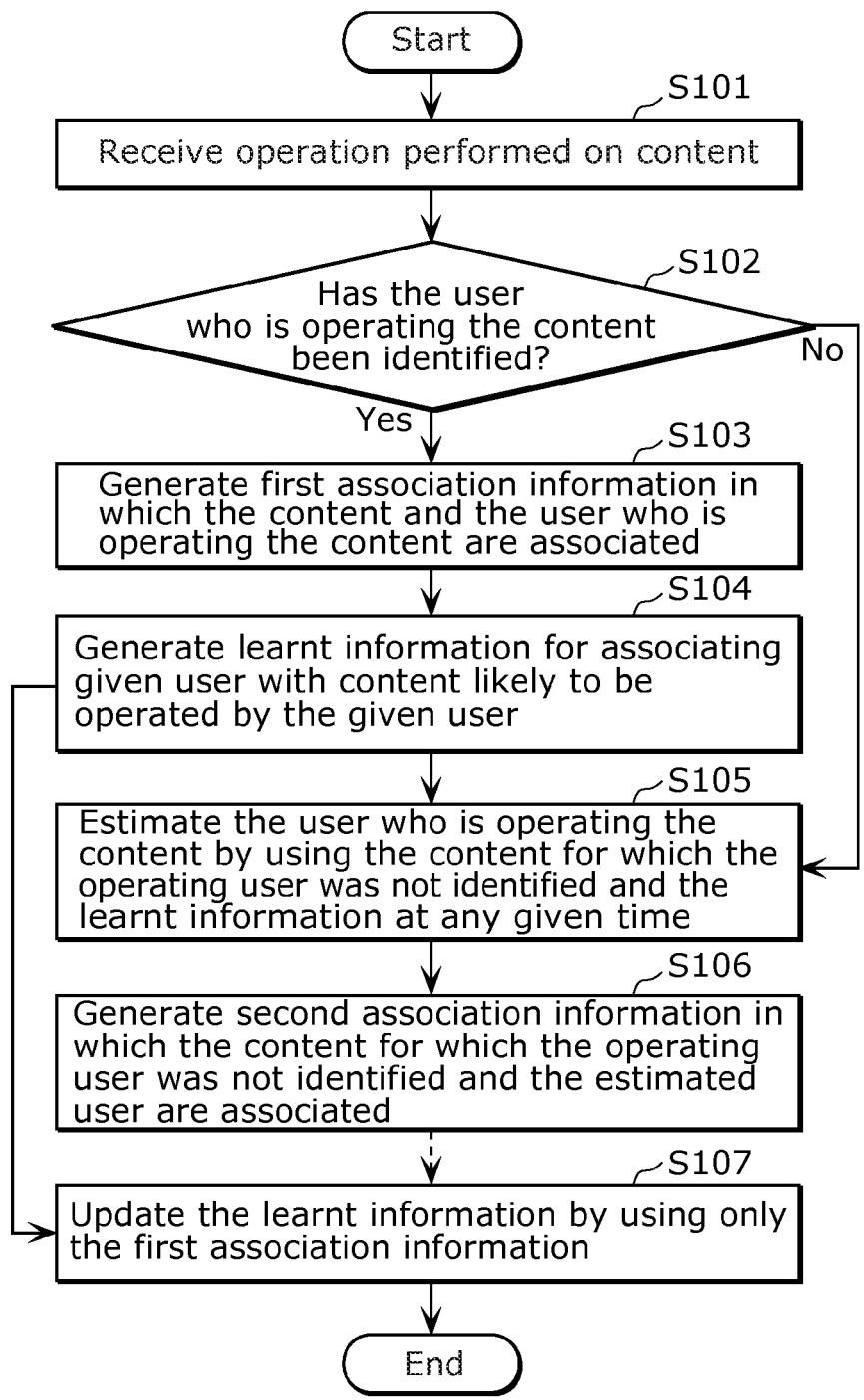
FIG. 9 is a flowchart of processing performed by the estimation apparatus according to Embodiment 1 of the present invention.

FIG. 9 is a flowchart of processing performed by the estimation apparatus 10 according to Embodiment 1 of the present invention.

In step S101 (receiving step), the receiving unit 101 receives an operation performed on a TV program (content). Specifically, the receiving unit 101 receives a scheduled recording of a TV program set by a user. In the case where the scheduled recording by the user has been set through an operation of the terminal apparatus 11 such as a PC, the receiving unit 101 receives program information and user information. In the case where the scheduled recording by the user has been set through an operation of the input apparatus 13 such as a remote controller, the receiving unit 101 receives only program information.

In step S102 (determining step), the determining unit 102 determines whether or not the operating user who has set the scheduled recording (operation) of the TV program (content) can be identified, based on the operation received by the receiving unit 101 in step S101. If the receiving unit 101 receives the user information together with the scheduled recording when the scheduled recording is received in step S101, the determining unit 102 determines that the operating user can be identified (Yes in step S102), and the procedure advances to step S103. If, on the other hand, the receiving unit 101 does not receive the user information together with the scheduled recording when the scheduled recording is received in step S101, the determining unit 102 determines that the operating user cannot be identified (No in step S102), and the procedure advances to step S105.

If it is determined in the determining step (step S102) that the operating user can be identified, in step S103 (first association information generating step), the first association information generation unit 103 generates first association information in which the TV program (content) for which the scheduled recording (operation) was set by the operating user and the operating user are associated with each other. In other words, in step S103, the first association information generation unit 103 generates the first association information in which the program information received by the receiving unit 101 in step S101 and the user who set the scheduled recording are associated with each other.

In step S104 (learning step), the learning unit 104 generates learnt information for associating a given user with a TV program (content) that is likely to be scheduled for recording (operated) by the given user, by using the first association information. Note that step S104 does not need to be executed immediately after step S103, and it is also possible to store the first association information and execute step S104 when, for example, there are sufficient calculation resources in the estimation apparatus 10 (program recording apparatus).

If it is determined in step S104 that the operating user cannot be identified, in step S105 (estimation step), the estimation unit 105 uses unidentified content, which is the TV program (content) for which the scheduled recording (operation) was set, and the learnt information so as to estimate the user who performed the operation on the unidentified content. Note that step S105 does not need to be executed immediately after step S102 or step S104, and it is also possible to store the program information for which the user who set the scheduled recording was not identified and execute step S105 when, for example, there are sufficient calculation resources in the estimation apparatus 10 (program recording apparatus).

In step S106 (second association information generating step), the second association information generation unit 106 generates second association information in which the unidentified program and the user estimated in step S105 are associated with each other. In other words, in step S106, the second association information generation unit 106 generates the second association information in which the program information for which the user who set the scheduled recording was not identified in step S102 and the user estimated in step S105 are associated with each other.

In step S107, the learning unit 104 updates the learnt information generated in step S104 by using, out of the first association information generated in step S103 and the second association information generated in step S106, only the first association information without using the second association information. In other words, the learning unit 104 updates the learnt information by using only the first association information out of the first association information and the second association information. After step S104 is performed at least once, then, step S107 can be asynchronously carried out at any given time. Also, the second association information generated in step S106 is not used in step S107, and thus the arrow pointing from step S106 to step S107 is indicated by a broken line.

The foregoing has been an operation performed by the estimation apparatus 10.

With the estimation apparatus 10 according to Embodiment 1, the second association information is managed separately from the first association information, and out of the first association information and the second association information, only the first association information is used to update the learnt information without using the second association information. Accordingly, it is possible to prevent a reduction in the accuracy of estimation caused by using the second association information in the same manner as the first association information.

In the manner described above, the estimation apparatus of Embodiment 1 can generate highly accurate association information. Such association information is useful particularly when there are a large number of content or users, and can be used in the following applications such as displaying content specific to each user, controlling access to content for each user, and recommending, for each user, content the user may like.

If the association information is used to display content specific to each user, it is possible to display content excluding the content recorded by other users, as a result of which, for example, the operating user can easily find content he/she wants to reproduce. Likewise, if the association information is used to control access to content for each user, it is possible to prevent a situation in which the content recorded by a given user is mistakenly operated (for example, deleted or edited) by another user. Also, if the association information is used to recommend content each user may like, it is possible to present useful information to the user. Because the association information can be used in the above-mentioned applications, generation of highly accurate association information as with the estimation apparatus according to one aspect of the present invention is useful.

[Embodiment 2]

Figure 10:
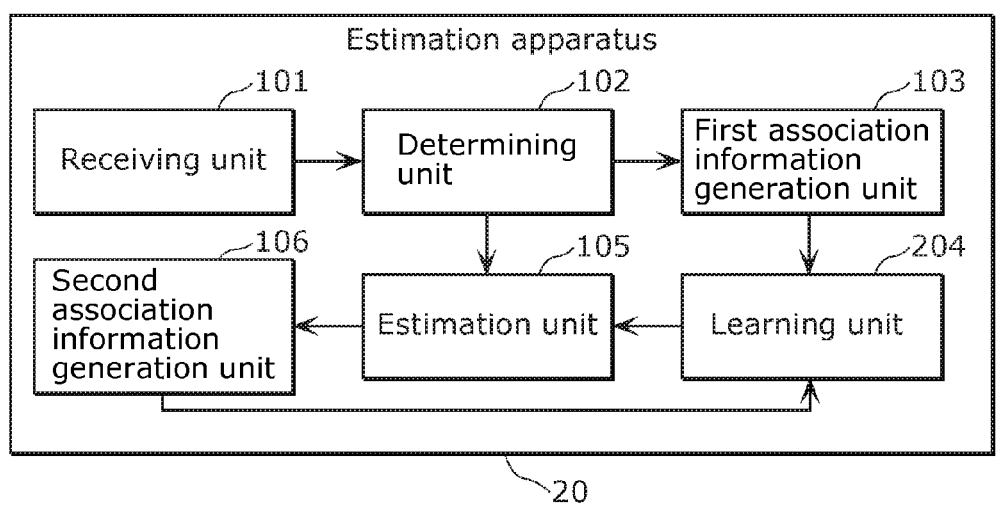
FIG. 10 is a diagram showing functional blocks of an estimation apparatus according to Embodiment 2 of the present invention.

FIG. 10 is a diagram showing functional blocks of an estimation apparatus 20 according to Embodiment 2 of the present invention. In FIG. 10, the same reference numerals are given to constituent elements that are the same as or correspond to the functional blocks of FIG. 2. Hereinafter, a description of the constituent elements that are the same as or correspond to the functional blocks of FIG. 2 is omitted. The estimation apparatus 20 according to Embodiment 2 is different from the estimation apparatus 10 according to Embodiment 1 in that when the learnt information is updated by the learning unit 204, the first association information generated by the first association information generation unit 103 and the second association information generated by the second association information generation unit 106 are weighted such that the weight of the second association information is smaller than that of the first association information, and both the first association information and the second association information that have been weighted are used.

The learning unit 204 reads out the first association information stored in the first association information generation unit 103, and generates learnt information for associating a given user with a TV program (content) that is likely to be operated by the given user, by using the read-out first association information. In other words, the learning unit 204 learns tendencies of association between the program information and the user, and generates and stores the learnt information, which is a result of learning.

Also, the learning unit 204 reads out the learnt information generated by the learning unit 204, the first association information generated by the first association information generation unit 103, and the second association information generated by the second association information generation unit 106, and uses the generated learnt information and the read-out first association information and second association information so as to weight the first association information and the second association information such that the weight of the second association information is smaller than that of the first association information. Then, the learning unit 204 learns by using both the first association information and the second association information that have been weighted, and updates the existing old learnt information with new learnt information, which is a result of learning, by overwriting. The learning unit 204 may update the learnt information through learning from scratch using all of the first association information and the second association information, or through learning using only an additions (i.e., a differences) of the first association information and the second association information that have been added after generation of the old learnt information.

FIG. 11 is a diagram showing an example of the learnt information generated by the learning unit 204 of the estimation apparatus 20 according to Embodiment 2 of the present invention. The learnt information shown in FIG. 11 is, as with the learnt information shown in FIG. 6, information generated by the learning unit 104 by counting the number of scheduled recordings each user has set for each genre and for each broadcast start time, which is assumed to be used in estimation of the operating user by using the naive Bayes classifier. Note that the second association information generated by the second association information generation unit 106 by using the TV program and the user estimated by the estimation unit 105 is weighted so as to count as less than 1. In other words, for the second association information, the counted number is multiplied by a factor less than 1. FIG. 11 shows the number of scheduled recordings counted by weighting FIG. 4 by using a weight of 1 and weighting FIG. 8 by using a weight of 0.1. FIG. 11 shows, for example, that a user named "father" has set a scheduled recording of a program whose genre is news show 2.1 times and a program whose broadcast start time is 23:00 2.1 times. In FIG. 11, each of the genre and the time is divided into three items, but these items may be integrated, or each of the genre and the time may be divided into more items.

Figure 12:
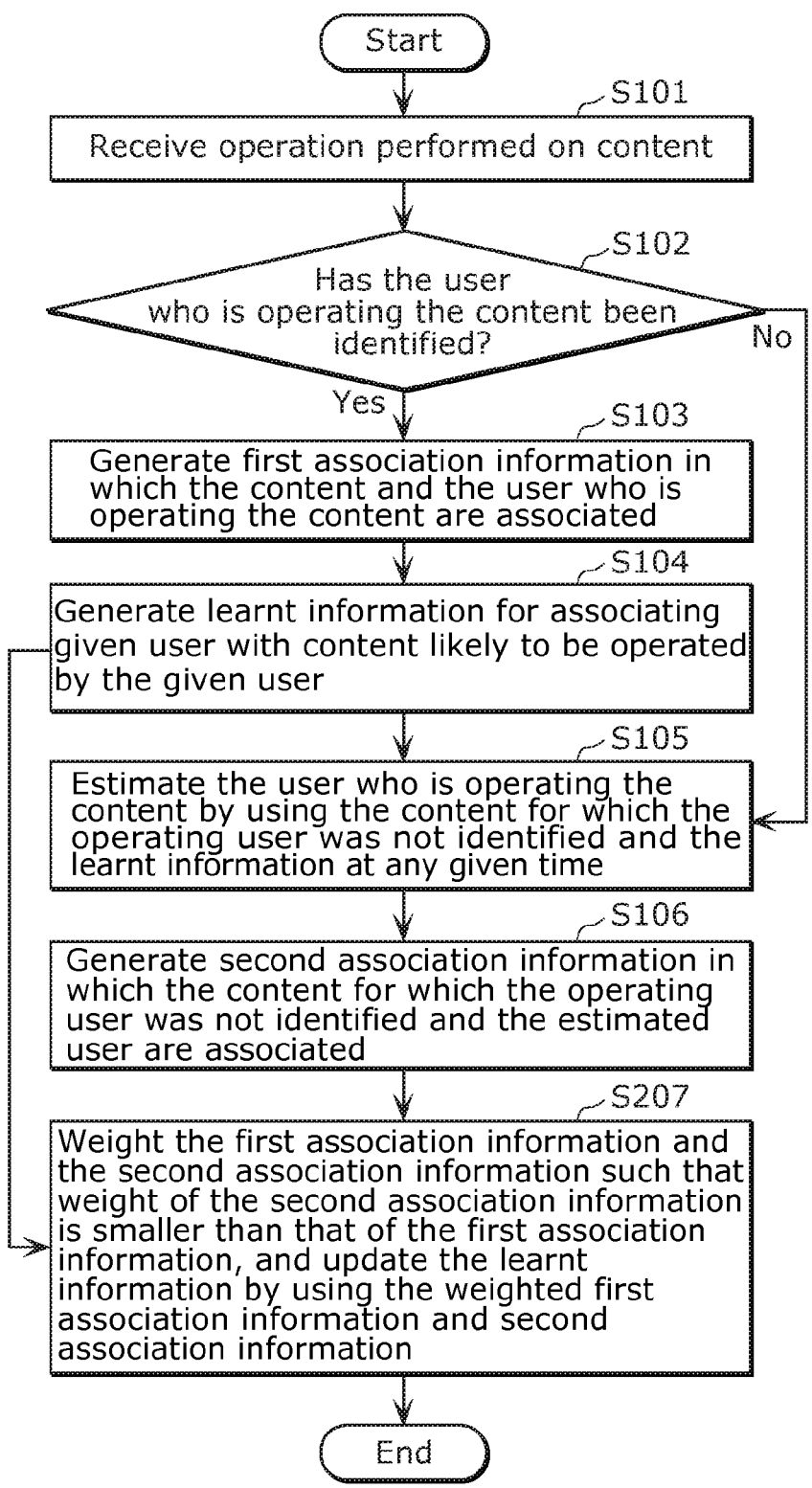
FIG. 12 is a flowchart of processing performed by the estimation apparatus according to Embodiment 2 of the present invention.

FIG. 12 is a flowchart of processing performed by the estimation apparatus 20 according to Embodiment 2 of the present invention. In FIG. 12, the same reference numerals are given to processing that is the same as or correspond to the processing of FIG. 9. Hereinafter, a description of the processing that is the same as or corresponds to the processing of FIG. 9 is omitted.

In step S207, the learning unit 204 weights the first association information generated in step S103 and the second association information generated in step S106 such that the weight of the second association information is smaller than that of the first association information, and uses both the first association information and the second association information that have been weighted so as to update the learnt information generated in step S104. After step S104 is performed at least once, then, step S107 can be asynchronously carried out at any given time.

With the estimation apparatus 20 according to Embodiment 2, the second association information is managed separately from the first association information, and at the time of update of the learnt information, the second association information is weighted together with the first association information such that the weight of the second association information is smaller than that of the first association information, and both the first association information and the second association information that have been weighted are used to update the learnt information. The conventional technology has a possibility that when the first association information is insufficient, the accuracy of estimation might be reduced due to lack of information needed at the time of learning. However, according to the present embodiment, the second association information that has been weighted together with the first association information such that its weight is smaller than that of the first association information is used, and therefore the accuracy of estimation can be improved.

With the estimation apparatus 20 according to Embodiment 2 described above, the weighting ratio between the first association information and the second association information is constantly set to 1:0.1, but the weighting ratio does not need to be constant and the ratio may be changed according to changes in the number of pieces of first association information.

For example, when the number of pieces of first association information is greater than a predetermined threshold value, the weight of the second association information may be reduced from 0.1 to 0.

In this case, when the number of pieces of first association information is not greater than the predetermined threshold value, the weighting ratio between the first association information and the second association information is set to 1:0, and the learnt information is updated by using only the first association information out of the first association information and the second association information. On the other hand, when the number of pieces of first association information is greater than the predetermined threshold value, the weighting ratio between the first association information and the second association information is set to 1:0.1 by changing the weight of the second association information, and the learnt information is updated by using both the first association information and the second association information that have been weighted.

With this configuration, when the number of pieces of first association information is not greater than the predetermined threshold value, the weight of the second association information, which is "estimated association information", is reduced, and the second association information whose weight has been reduced is added to learning, whereby the association information used at the time of learning can be increased as compared with the case where only the first association information is used, and therefore the accuracy of estimation can be improved.

On the other hand, when the number of pieces of first association information is sufficient, adding the second association information to learning may compromise the effect of improving the accuracy of estimation. In other words, when the number of pieces of first association information is sufficient, use of the second association information causes a reduction in the accuracy of estimation. Accordingly, by not using the second association information at the time of learning when the number of pieces of first association information is greater than the predetermined threshold value, it is possible to prevent a reduction in the accuracy of estimation.

Also, for example, when the number of pieces of first association information is greater than the predetermined threshold value, the weight of the second association information may be increased from 0 to 0.1.

In this case, when the number of pieces of first association information is not greater than the predetermined threshold value, the weighting ratio between the first association information and the second association information is set to 1:0, and the learnt information is updated by using only the first association information out of the first association information and the second association information. On the other hand, when the number of pieces of first association information is greater than the predetermined threshold value, the weighting ratio between the first association information and the second association information is set to 1:0.1 by changing the weight of the second association information, and the learnt information is updated by using both the first association information and the second association information that have been weighted.

In the above variation, the weighting ratio of the second association information is changed between two values depending on whether or not the number of pieces of first association information is greater than a predetermined threshold value, but the present invention is not limited thereto. The weighting ratio of the second association information may be changed by increasing or decreasing its value as the number of pieces of first association information increases.

[Embodiment 3]

Figure 13:
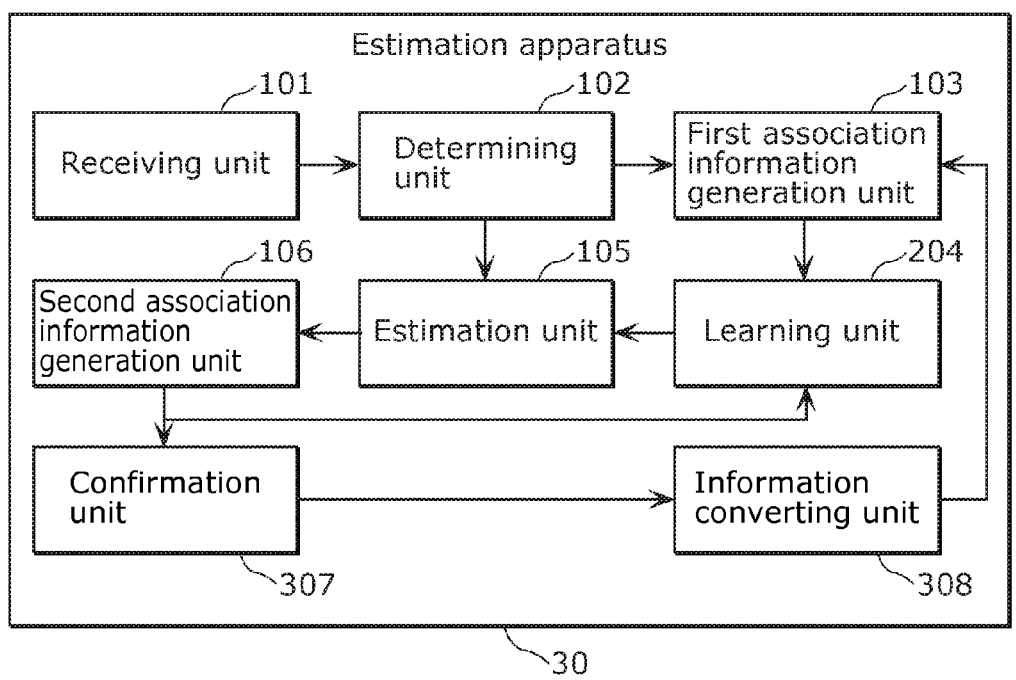
FIG. 13 is a diagram showing functional blocks of an estimation apparatus according to Embodiment 3 of the present invention.

FIG. 13 is a diagram showing functional blocks of an estimation apparatus 30 according to Embodiment 3 of the present invention. In FIG. 13, the same reference numerals are given to constituent elements that are the same as or correspond to the functional blocks of FIG. 10. Hereinafter, a description of the constituent elements that are the same as or correspond to the functional blocks of FIG. 10 is omitted. The estimation apparatus 30 according to Embodiment 3 is different from the estimation apparatus 20 according to Embodiment 2 in that the estimation apparatus 30 further includes a user confirmation unit 307 and an information converting unit 308.

The user confirmation unit 307 reads out the second association information generated by the second association information generation unit 106, and confirms with the user whether or not the second association information is correct.

FIG. 14 is a diagram showing an example of a confirmation screen displayed by the user confirmation unit 307 of the estimation apparatus 30 according to Embodiment 3 of the present invention. FIG. 14 shows that the user who has set a schedule recording of program H has been estimated as "mother", and the estimation result has been determined as correct by the user who is currently operating the apparatus.

The information converting unit 308 stores the second association information that has been confirmed as correct by the user confirmation unit 307, as the first association information generated by the first association information generation unit 103. After this, the stored information will be treated as first association information.

Note that the first association information and the second association information do not need to be managed by using separate tables. In the case where the first association information and the second association information are managed by using the same table, they may be managed by setting identifiable flags thereto. The same applies to the estimation apparatus 10 of Embodiment 1 and the estimation apparatus 20 of Embodiment 2.

In other words, the processing for deeming the second association information that has been confirmed as correct by the user confirmation unit 307 as first association information, which is performed by the information converting unit 308, can be performed as follows. In the case where the first association information and the second association information are managed by using separate tables, the information converting unit 308 moves the second association information that has been confirmed as correct by the user confirmation unit 307 into the first association information. Also, in the case where the first association information and the second association information are managed by the same table by setting separate flags thereto, the information converting unit 308 converts the flag of the second association information that has been confirmed as correct by the user confirmation unit 307 into a flag indicating the first association information.

Figure 15:
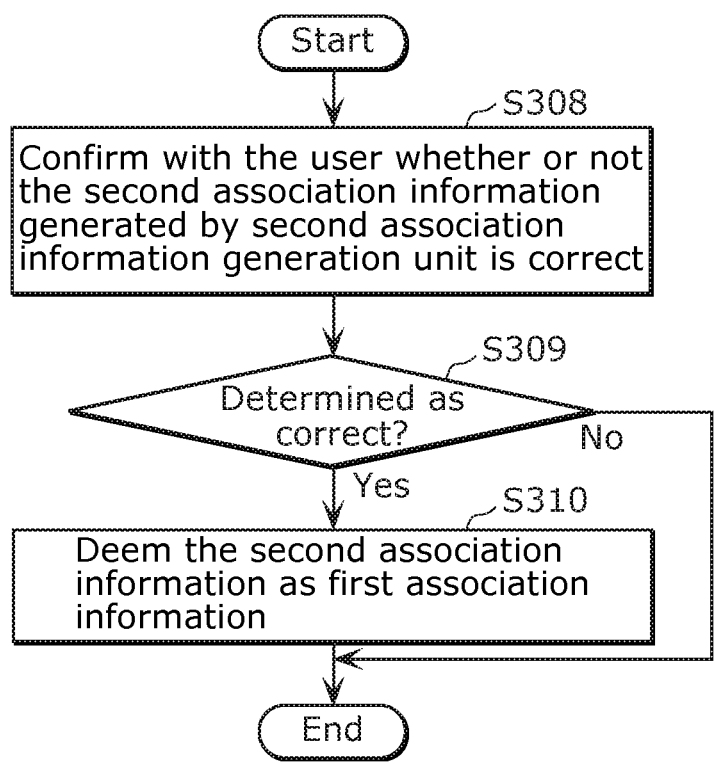
FIG. 15 is a flowchart of user confirmation processing performed by the estimation apparatus according to Embodiment 3 of the present invention.

FIG. 15 is a flowchart of user confirmation processing performed by the estimation apparatus 30 according to Embodiment 3 of the present invention.

Step S308 confirms with the user whether or not the second association information generated in step S106 shown in FIG. 12 is correct. After step S106 is performed at least once, then, step S308 can be asynchronously carried out at any given time.

Step S309 determines whether or not the second association information was confirmed as correct by the user in step S308. If it is determined that the second association information was confirmed as correct by the user (Yes in S309), the procedure advances to step S310. If it is determined that the second association information was confirmed as incorrect by the user (No in S309), the user confirmation processing ends.

Step S310 deems the second association information that has been confirmed as correct by the user in step S309 as the first association information generated in step S103 of FIG. 12, and ends the user confirmation processing.

With the estimation apparatus 30 according to Embodiment 3, a piece of information that has been determined as having a correct association from among the second association information is deemed as first association information, thereby increasing the first association information, and thus the accuracy of estimation can be improved.

With the estimation apparatus 30 according to Embodiment 3 described above, the user confirmation unit 307 performs confirmation as to whether or not the second association information is correct by prompting the user to provide an input via the confirmation screen shown in FIG. 14, but the present invention is not limited thereto. For example, in the case where a user who has been authenticated by the estimation apparatus 10 reproduces unidentified content recorded in the estimation apparatus 10, the information converting unit 308 may perform processing for deeming second association information in which the user and the unidentified content reproduced by an operation by the user are associated with each other, as first association information. In this way, even if the user does not confirm that the second association information is correct, the estimated second association information can be reliably deemed as reliable first association information. Accordingly, it is possible to obtain reliable first information by conversion from the second association information without the user having to perform a confirmation operation.

[Other Embodiments]

With the estimation apparatus 10 according to Embodiment 1 described above, in the flowchart of processing performed by the estimation apparatus 10, the learning unit 104 uses only the first association information out of the first association information and the second association information in order to update the learnt information in step S107 performed after step S106, but the present invention is not limited thereto. Also, with the estimation apparatus 20 according to Embodiment 2 described above, in the flowchart of processing performed by the estimation apparatus 20, the learning unit 204 weights the first association information and the second association information such that the weight of the second association information is smaller than that of the first association information and uses the first association information and the second association information that have been weighted to update the learnt information in step S207 performed after step S106, but the present invention is not limited thereto.

Figure 16:
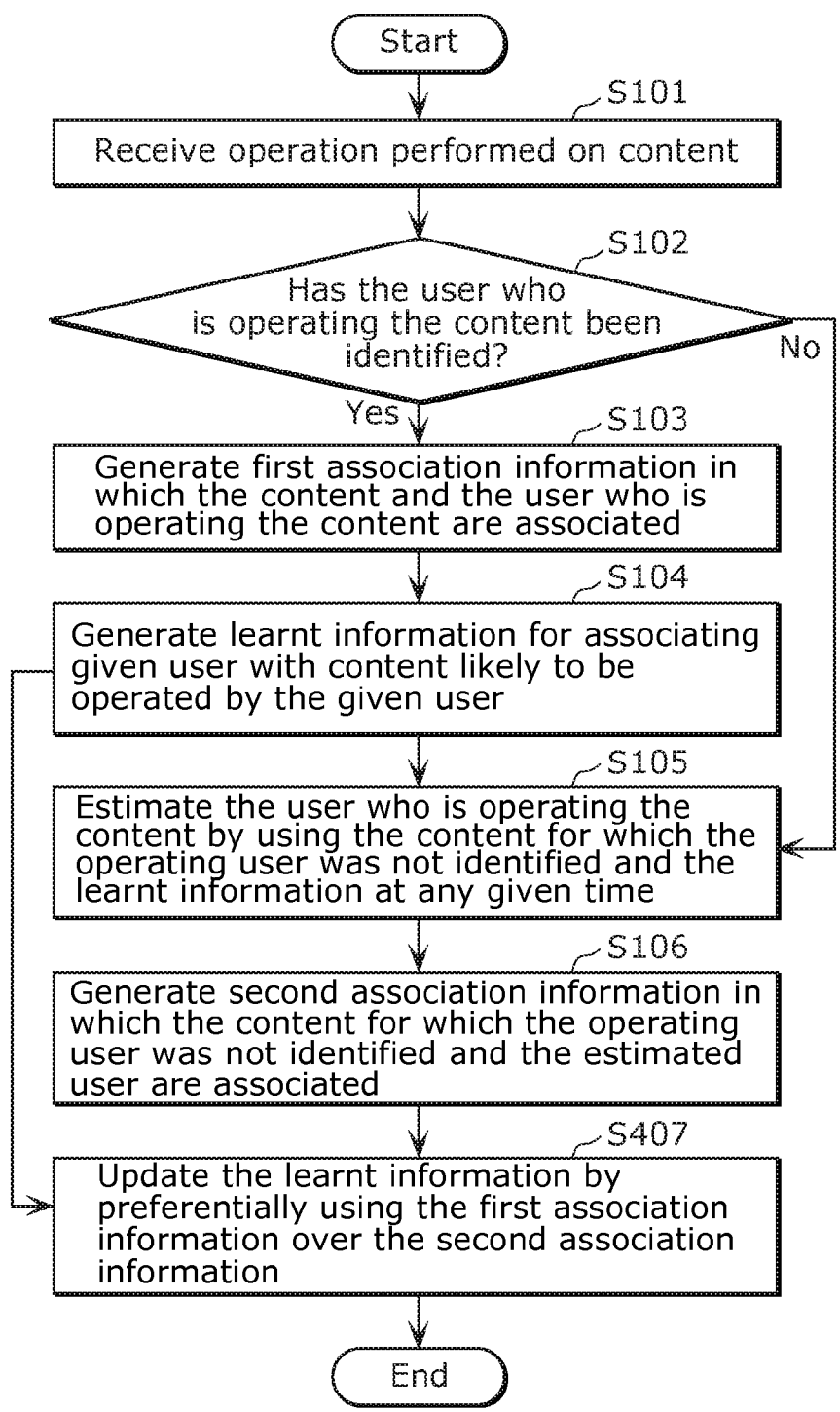
FIG. 16 is a flowchart of processing performed by an estimation apparatus according to another embodiment of the present invention.

For example, step S407, which will be described below, may be performed as processing performed after step S106. FIG. 16 is a flowchart of processing performed by an estimation apparatus according to another embodiment of the present invention. In FIG. 16, the same reference numerals are given to processing that is the same as or corresponds to the processing of FIG. 9. Hereinafter, a description of the processing that is the same as or corresponds to the processing of FIG. 9 is omitted. In step S407, the learning unit updates the learnt information by preferentially using the first association information generated in step S103 over the second association information generated in step S106.

Also, with the estimation apparatus 20 according to Embodiment 2 described above, the first association information and the second association information are weighted such that the weight of the second association information is smaller than that of the first association information, and both the first association information and the second association information that have been weighted are used to update the learnt information, but the update of the learnt information does not necessarily require the use of both the first association information and the second association information. For example, even when the first association information and the second association information are weighted such that the weight of the second association information is smaller than that of the first association information, by setting the weight of the first association information to 1 and the weight of the second association information to 0, only the first association information may be used out of the first association information and the second association information in order to update the learnt information, as in the estimation apparatus 10 of Embodiment 1.

Note that the functional blocks of the block diagrams (FIG. 2, FIG. 10, FIG. 13, etc.) are typically implemented as LSIs, which are integrated circuits. They may be individual single chips, or a part or all of them may be configured in a single chip (for example, the functional blocks excluding memory may be configured in a single chip).

The above example has been discussed using an LSI, but the LSI may be called IC, system LSI, super LSI, or ultra LSI according to the degree of integration.

The method for implementing an integrated circuit is not limited to an LSI, and the integration of a circuit may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Furthermore, if a technique for implementing an integrated circuit that can replace LSIs appears by another technique resulting from the progress or derivation of semiconductor technology, the functional blocks may of course be integrated by using that technique. Application of biotechnology or the like is possible.

Alternatively, among the functional blocks, only the unit for storing the data to be encoded or decoded may be configured separately without being incorporated in a single chip.

Also, the estimation apparatuses 10, 20 and 30 according to Embodiments 1 to 3 described above are not limited to program recording apparatuses, and may be implemented as servers or the like. As the method of scheduled recording that adds user information, fingerprint authentication may be performed using a remote controller, face image authentication may be performed using a camera attached to a display, or the user in operation may be specified by selecting a user name or the like.

Also, the update of the learnt information by the learning units 104 and 204 may be performed using association information accumulated for a predetermined length of time until the time of update (only the first association information, or the first association information and the second association information that have been weighted). In other words, the learning units 104 and 204 may perform the update by using association information accumulated during a period between the time of update and a time point preceding by a predetermined length of time. In this way, by updating the learnt information by using the newest association information, the second association information can be estimated with high accuracy even when the user's preference changes over time.

The term "content" as used in the present invention encompasses not only content for audio-visual devices such as broadcast programs, photos, and music, but also measured data of wellness devices and operated content in devices that accumulate operational history.

For example, in the case where the content management apparatus is a weighing scale, a single measured value of weight corresponds to "content", the measured subject corresponds to "user", and measurement corresponds to "operation". It estimates the measured subject based on the measured values of weight measured in a state in which the users have been identified through user registration or the like when the frequent user is not identified.

In the case where the content management apparatus is a drive recorder, a single instance of driving corresponds to "content", the driver corresponds to "user", and driving corresponds to "operation". It estimates the driver based on the content of driving obtained in a state in which the users have been identified through user registration or the like when the frequent user is not identified. As used herein, the content of driving encompasses routes of travel and driving operations such as the number of brakes.

Furthermore, there are household appliances other than audio-visual devices that can perform control from a terminal linked to an individual person and manage the history of control commands, such as mobile phones.

For example, some microwave ovens include a unit for allowing a cook to designate cooking conditions, such as reheating time and temperature, and execute cooking commands through either direct operation of the microwave ovens or operation via wireless communication from a portable terminal, and manage the history of the cooking commands. With an operation from the portable terminal, the user can be identified because the terminal is linked to an individual person. In the case of such a household appliance, the content of a single control command corresponds to "content", the user of the household appliance corresponds to "user", and the control command corresponds to "operation". It estimates the user who directly operated the appliance whose user has not been identified, based on the content of the control command from the portable terminal whose user has been identified.

The techniques described in the above-described aspects can be implemented in, for example, the following cloud service types. However, the type in which the techniques described in the above aspects are implemented is not limited thereto.

(Service Type 1: Stand-Alone Data Center Type)

Figure 17:
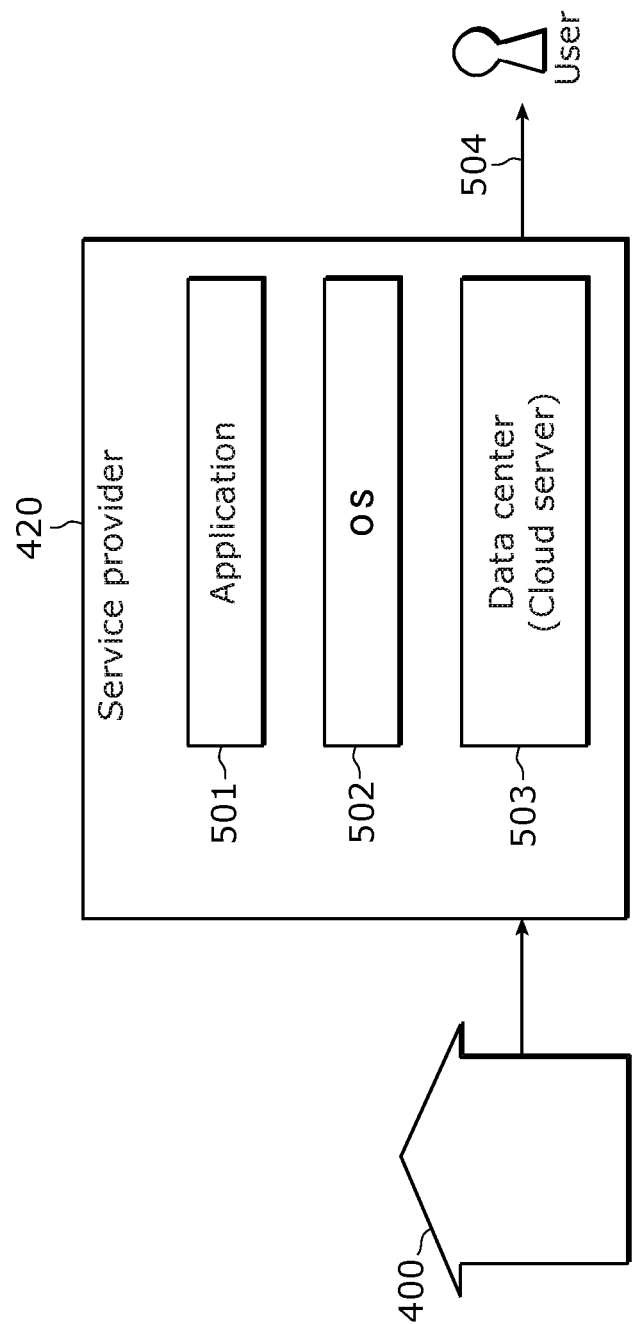
FIG. 17 is a diagram illustrating service type 1 according to another embodiment of the present invention.

FIG. 17 shows service type 1 (stand-alone data center type). This is the type in which a service provider 420 acquires information from a group 400 and provides services to users. In this type, the service provider 420 functions as a data center operating company. In other words, the service provider owns a data center (cloud server) 503 that manages big data. Accordingly, there is no data center operating company.

In this type, the service provider 420 operates and manages the data center (cloud server) 503. The service provider 420 also manages an OS 502 and an application 501. The service provider 420 provides a service indicated by an arrow 504 by using the OS 502 and the application 501 managed by the service provider 420.

(Service Type 2: IaaS Based Type)

Figure 18:
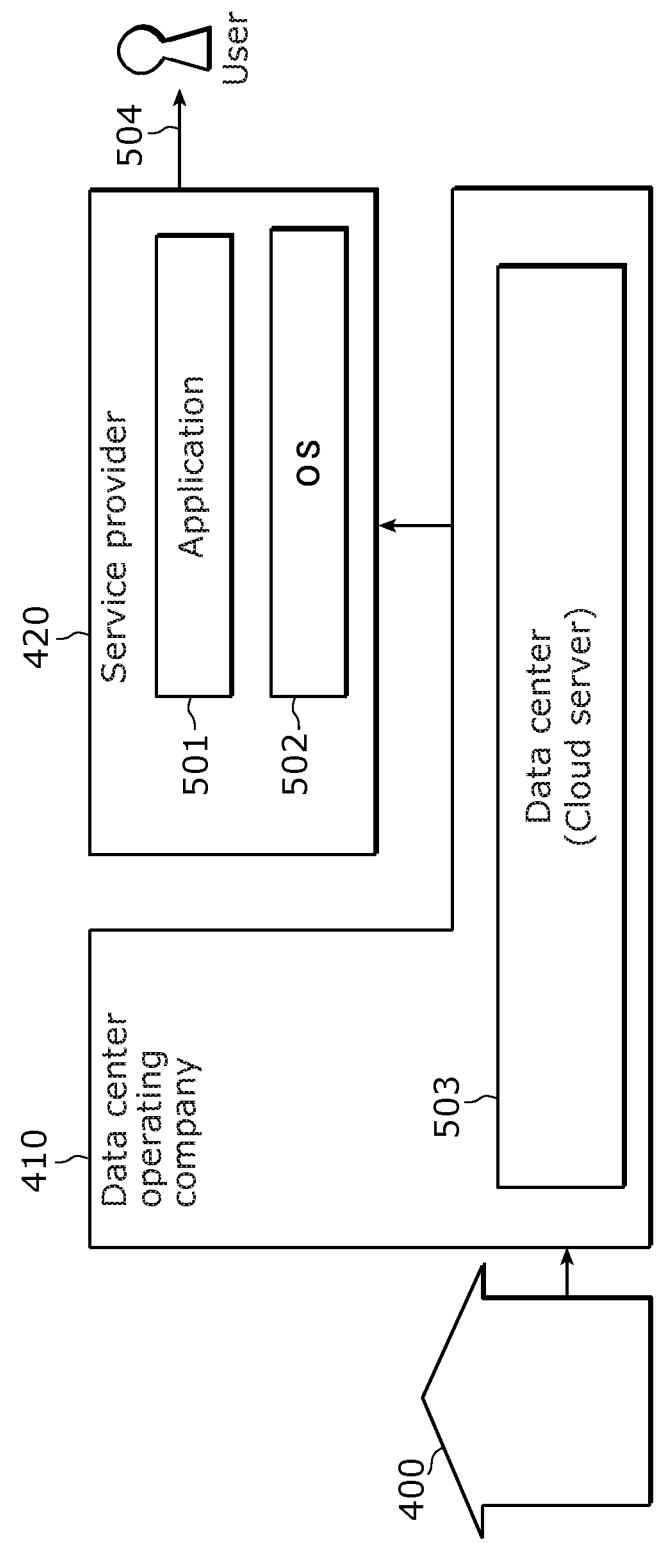
FIG. 18 is a diagram illustrating service type 2 according to another embodiment of the present invention.

FIG. 18 shows service type 2 (IaaS based type). As used herein, IaaS is an abbreviation of Infrastructure as a Service, and is a cloud service delivery model that provides infrastructures for configuring and operating computer systems as services offered via the Internet.

In this type, a data center operating company operates and manages the data center (cloud server) 503. Also, the service provider 420 manages the OS 502 and the application 501. The service provider 420 provides a service indicated by the arrow 504 by using the OS 502 and the application 501 managed by the service provider 420.

(Service Type 3: PaaS Based Type)

Figure 19:
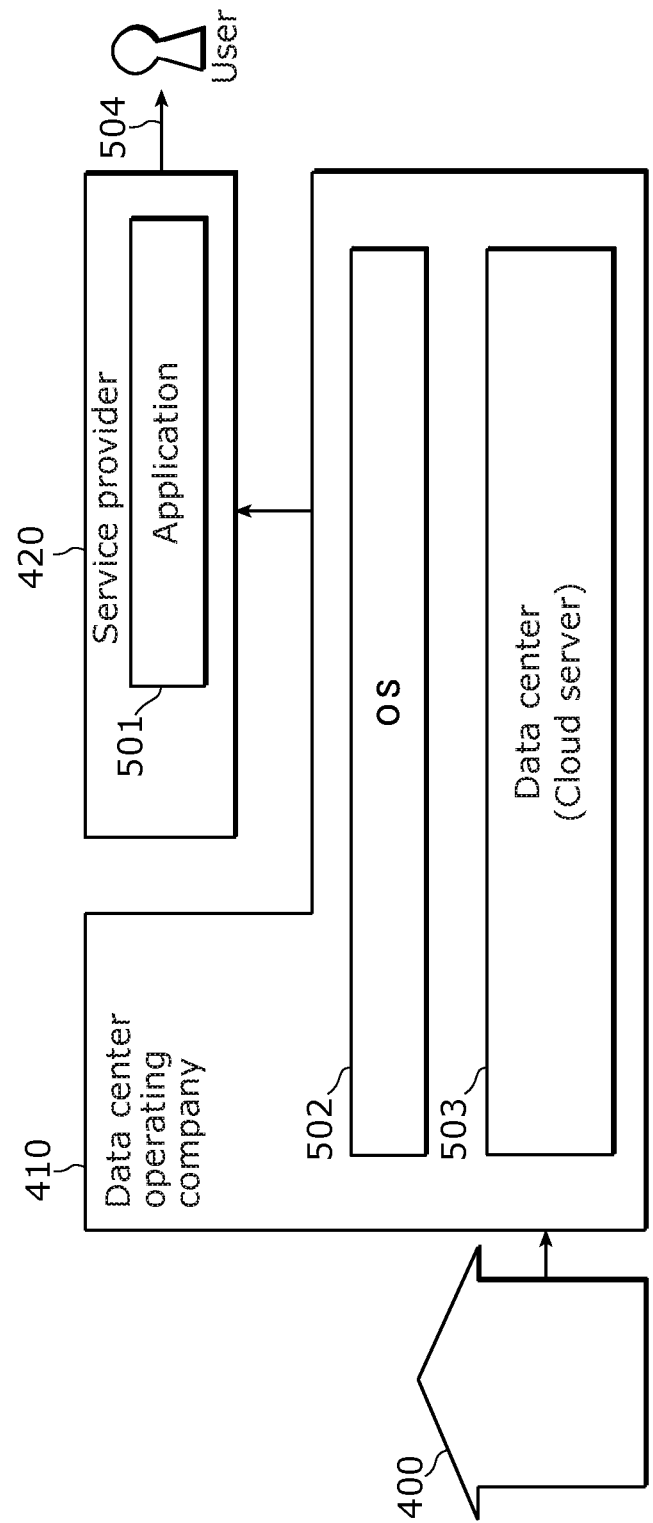
FIG. 19 is a diagram illustrating service type 3 according to another embodiment of the present invention.

FIG. 19 shows service type 3 (PaaS based type). As used herein, PaaS is an abbreviation of Platform as a Service, and is a cloud service delivery model that provides platforms serving as a base for configuring and operating software as services offered via the Internet.

In this type, the data center operating company 410 manages the OS 502, and operates and manages the data center (cloud server) 503. Also, the service provider 420 manages the application 501. The service provider 420 provides a service indicated by the arrow 504 by using the OS 502 managed by the data center operating company and the application 501 managed by the service provider 420.

(Service Type 4: SaaS Based Type)

Figure 20:
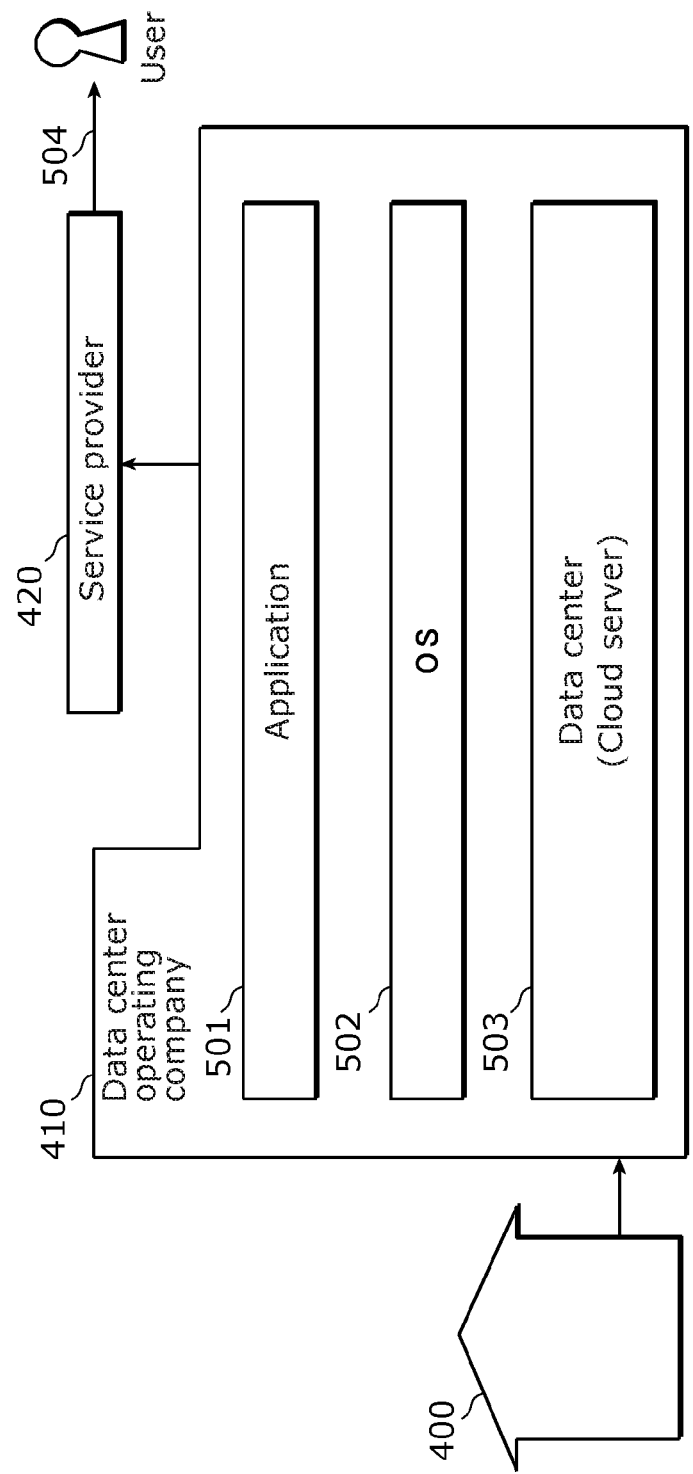
FIG. 20 is a diagram illustrating service type 4 according to another embodiment of the present invention.

FIG. 20 shows service type 4 (SaaS based type). As used herein, SaaS is an abbreviation of Software as a Service, and is a cloud service delivery model that has a function of allowing, for example, companies and individuals (users) who do not own data centers (cloud servers) to use applications provided by platform providers who own their data centers (cloud servers) via networks such as the Internet.

In this type, the data center operating company 410 manages the application 501 and the OS 502, and operates and manages the data center (cloud server) 503. Also, the service provider 420 provides a service indicated by the arrow 504 by using the OS 502 and the application 501 managed by the data center operating company 410.

In any of the above types described above, it is construed that the service provider 420 performs an act of providing services. Also, for example, the service provider or the data center operating company may develop, on their own, an OS, an application or a big data database, or may outsource such development to a third party.

The foregoing has described the embodiments of the estimation apparatus of the present invention, but the present invention is not limited to the embodiments given above. Embodiments implemented by making various modifications conceived by a person skilled in the art to any of the embodiments described herein or embodiments configured by combining the structural elements of different embodiments without departing from the spirit of the present invention may also fall within the scope of the present invention.

[Industrial Applicability]

The estimation apparatus of the present invention is applicable to various applications, and is highly useful as, for example, an information display unit for each user in a television receiver or a digital video recorder.

[Reference Signs List]

10, 20, 30 Estimation Apparatus
11 Terminal Apparatus
12 Output Apparatus
13 Input Apparatus
101 Receiving Unit
102 Determining Unit
103 First Association Information on Generation Unit 104, 204 Learning Unit
105 Estimation Unit
106 Second Association Information Generation Unit
307 User Confirmation Unit
308 Information Converting Unit
400 Group
410 Data Center Operating Company
420 Service Provider
501 Application
502 OS
503 Data Center (Cloud Server)
504 Arrow

The invention claimed is:

1. An estimation apparatus that estimates an association between content and a user who performed an operation on the content, the apparatus comprising:
a processor;
a receiving unit configured to receive an operation performed on content;
a determining unit configured to determine, using said processor, whether or not an operating user who has performed the operation on the content can be identified based on the operation received by the receiving unit;
a first association information generation unit configured to, when it is determined by the determining unit that the operating user can be identified, generate first association information in which the content subjected to the operation performed by the operating user and the operating user are associated with each other;
a learning unit configured to generate learnt information for associating a given user with content likely to be operated by the given user by using the first association information;
an estimation unit configured to estimate a user who has performed an operation on unidentified content by using the unidentified content and the learnt information generated by the learning unit, the unidentified content being content subjected to the operation when it is determined by the determining unit that the operating user cannot be identified; and
a second association information generation unit configured to generate second association information in which the unidentified content and the user estimated by the estimation unit are associated with each other,
wherein the learning unit is configured to update the learnt information by preferentially using the first association information over the second association information, and
wherein the learning unit is configured to weight the first association information and the second association information such that a weight of the second association information is smaller than a weight of the first association information, and update the learnt information by using the first association information and the second association information that have been weighted.

2. The estimation apparatus according to claim 1, wherein the learning unit is configured to update the learnt information by using only the first association information out of the first association information and the second association information.

3. The estimation apparatus according to claim 1, wherein the learning unit is configured to change the weight of the first association information or the second association information according to a change in the number of pieces of the first association information.

4. The estimation apparatus according to claim 3, wherein the learning unit is configured to:
when the number of pieces of the first association information is not greater than a predetermined threshold value, update the learnt information by using the first association information and the second association information; and
when the number of pieces of the first association information is greater than the threshold value, update the learnt information by using only the first association information.

5. The estimation apparatus according to claim 3, wherein the learning unit is configured to:
when the number of pieces of the first association information is not greater than a predetermined threshold value, update the learnt information by using only the first association information; and
when the number of pieces of the first association information is greater than the threshold value, update the learnt information by using the first association information and the second association information.

6. The estimation apparatus according to claim 1, further comprising:
a user confirmation unit configured to confirm with a user whether or not the second association information generated by the second association information generation unit is correct; and
an information converting unit configured to convert, into the first association information, the second association information that has been confirmed as correct by the user confirmation unit.

7. An estimation method for estimating an association between content and a user who performed an operation on the content, the method comprising:
receiving an operation performed on content;
determining, using a processor, whether or not an operating user who has performed the operation on the content can be identified based on the operation received in the receiving;
when it is determined in the determining that the operating user can be identified, generating first association information in which the content subjected to the operation performed by the operating user and the operating user are associated with each other;
generating learnt information for associating a given user with content likely to be operated by the given user by using the first association information;
estimating a user who has performed an operation on unidentified content by using the unidentified content and the learnt information generated in the generating of learnt information, the unidentified content being content subjected to the operation when it is determined in the determining that the operating user cannot be identified; and
generating second association information in which the unidentified content and the user estimated in the estimating are associated with each other,
wherein in the generating of learnt information, the learnt information is updated by preferentially using the first association information over the second association information, and
wherein in the generating of learnt information, the first association information and the second association information are weighted such that a weight of the second association information is smaller than a weight of the first association information, and the learnt information is updated by using the first association information and the second association information that have been weighted.

8. A non-transitory computer-readable recording medium on which a program is stored, the program for causing a computer to execute the estimation method according to claim 7.

9. An integrated circuit provided in an estimation apparatus that estimates an association between content and a user who performed an operation on the content, the integrated circuit comprising:
- a processor;
- a receiving unit configured to receive an operation performed on content;
- a determining unit configured to determine, using said processor, whether or not an operating user who has performed the operation on the content can be identified based on the operation received by the receiving unit;
- a first association information generation unit configured to, when it is determined by the determining unit that the operating user can be identified, generate first association information in which the content subjected to the operation performed by the operating user and the operating user are associated with each other;
- a learning unit configured to generate learnt information for associating a given user with content likely to be operated by the given user by using the first association information;
- an estimation unit configured to estimate a user who has performed an operation on unidentified content by using the unidentified content and the learnt information generated by the learning unit, the unidentified content being content subjected to the operation when it is determined by the determining unit that the operating user cannot be identified; and
- a second association information generation unit configured to generate second association information in which the unidentified content and the user estimated by the estimation unit are associated with each other,
- wherein the learning unit is configured to update the learnt information by preferentially using the first association information over the second association information, and
- wherein the learning unit is configured to weight the first association information and the second association information such that a weight of the second association information is smaller than a weight of the first association information, and update the learnt information by using the first association information and the second association information that have been weighted.

* * * * *